US012670216B2

(12) United States Patent
Oshin et al.

(10) Patent No.: US 12,670,216 B2
(45) Date of Patent: Jun. 30, 2026

(54) METHOD FOR AUTOMATIC GENERATION OF FREQUENTLY ASKED QUESTIONS

(71) Applicant: JPMORGAN CHASE BANK, N.A., New York, NY (US)

(72) Inventors: Olusegun Oshin, Edison, NJ (US); Shuaidong Pan, West New York, NJ (US); Milad Zafar Nezhad, McKinney, TX (US); Ale Nabijee, Summit, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 18/940,496

(22) Filed: Nov. 7, 2024

(65) Prior Publication Data

US 2026/0127226 A1 May 7, 2026

(51) Int. Cl.
*G06F 16/00* (2019.01)
*G06F 16/9032* (2019.01)

(52) U.S. Cl.
CPC .. *G06F 16/90324* (2019.01); *G06F 16/90332* (2019.01)

(58) Field of Classification Search
None
See application file for complete search history.

(56) References Cited

U.S. PATENT DOCUMENTS

| | | | | |
|---|---|---|---|---|
| 7,197,460 | B1 * | 3/2007 | Gupta | G06F 3/167 |
| | | | | 704/270.1 |
| 12,259,913 | B1 * | 3/2025 | Muschett | G06F 16/38 |
| 12,417,349 | B2 * | 9/2025 | Gaur | G06F 16/243 |
| 2017/0132187 | A1 * | 5/2017 | Contreras | G06F 40/205 |
| 2018/0081627 | A1 * | 3/2018 | Bajekal | G06F 16/489 |
| 2020/0110732 | A1 * | 4/2020 | Beaver | G06Q 10/10 |
| 2021/0390418 | A1 * | 12/2021 | Mass | G06N 3/08 |
| 2021/0406735 | A1 * | 12/2021 | Nahamoo | G06F 16/24522 |
| 2024/0012842 | A1 * | 1/2024 | Kislal | G06F 16/3347 |
| 2024/0296295 | A1 * | 9/2024 | Russell | G06F 40/56 |

(Continued)

OTHER PUBLICATIONS

Kale, Sahil, Gautam Khaire, and Jay Patankar. "FAQ-Gen: An automated system to generate domain-specific FAQs to aid content comprehension." arXiv preprint arXiv:2402.05812 (2024). (Year: 2024).*

*Primary Examiner* — Polina G Peach
(74) *Attorney, Agent, or Firm* — GREENBERG TRAURIG LLP

(57) ABSTRACT

Methods and systems for generating a frequently asked questions are provided, which include defining, by a computer program executed by a computer, a first large language model (LLM) with a user query and a feedback of the user query; refining, by the computer program, the user query to a question set based on the feedback, the question set comprising one or more sentences; defining, by the computer program, a second LLM to generate a first set of question and answer pairs from a source document; defining, by the computer program, a third LLM to generate a content set from the source document based on a rewriting of the source document; selecting, by the computer program, top questions from the content set to be provided to the second LLM; and generating, by the second LLM, a second set of question and answer pairs based on the top questions.

3 Claims, 4 Drawing Sheets

(56)     References Cited

U.S. PATENT DOCUMENTS

| | | | | |
|---|---|---|---|---|
| 2024/0311407 A1* | 9/2024 | Barron | ................. | G06F 16/3344 |
| 2024/0403341 A1* | 12/2024 | Berglund | ............ | G06F 16/3326 |
| 2025/0005057 A1* | 1/2025 | Khosla | .................... | G06F 40/40 |
| 2025/0045150 A1* | 2/2025 | Agrawal | ............. | G06F 11/3684 |
| 2025/0103625 A1* | 3/2025 | Addanki | ............. | G06F 16/3326 |
| 2025/0111192 A1* | 4/2025 | Bayless | ................. | G06N 3/006 |
| 2025/0117814 A1* | 4/2025 | Bennett | ............. | G06Q 30/0627 |
| 2025/0124060 A1* | 4/2025 | Hackman | ............ | G06F 16/3329 |
| 2025/0156644 A1* | 5/2025 | Neerukonda | ........ | G06N 3/0455 |
| 2025/0156955 A1* | 5/2025 | Ramaswamy | ......... | G06Q 40/08 |
| 2025/0200332 A1* | 6/2025 | Tabacof | .............. | G06N 3/0455 |
| 2025/0258818 A1* | 8/2025 | Raheja | ............. | G06F 16/24539 |
| 2025/0335795 A1* | 10/2025 | Gupta | ..................... | G06N 5/04 |
| 2025/0378028 A1* | 12/2025 | Boué | .................. | G06F 12/0802 |

* cited by examiner

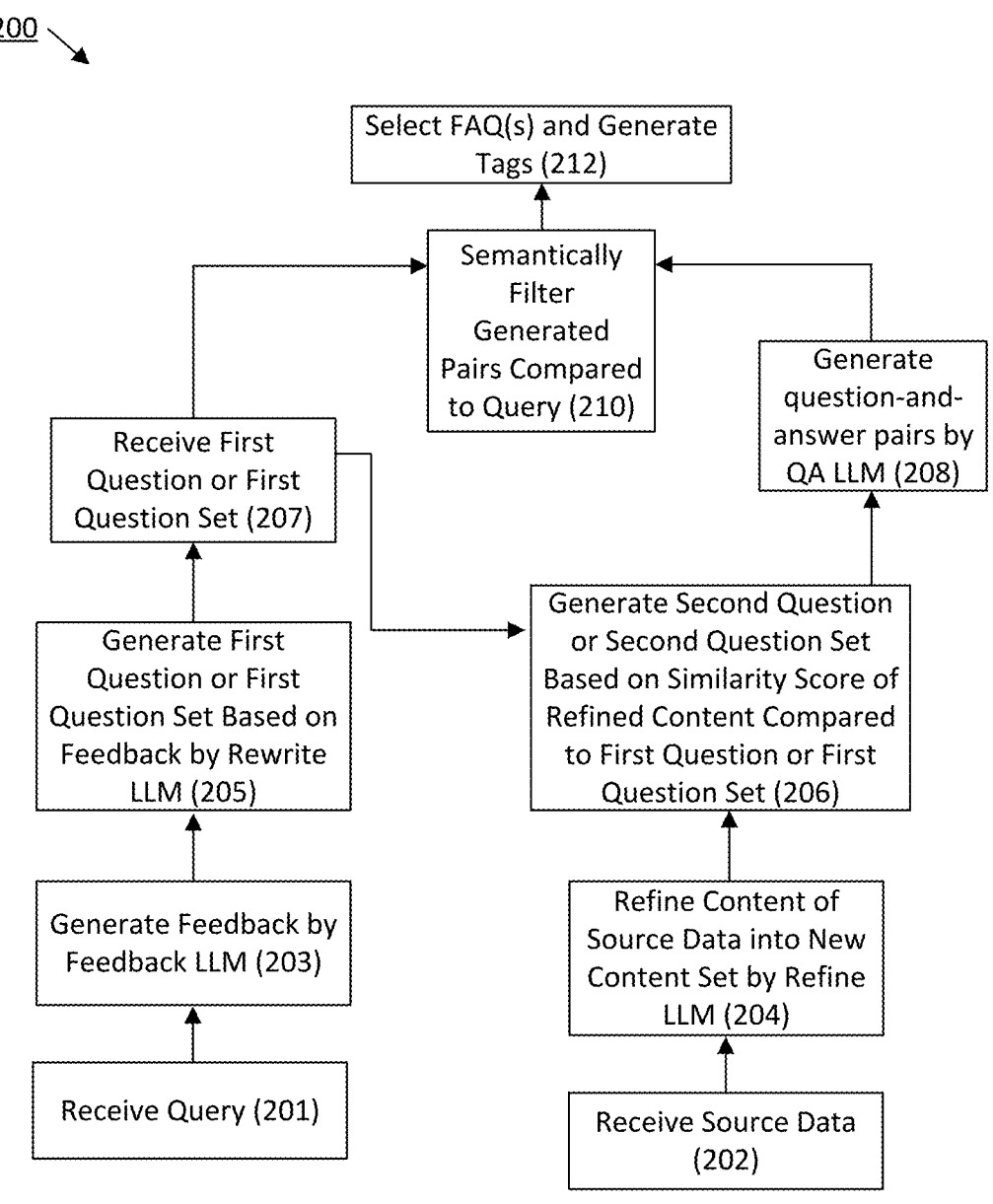

200

Select FAQ(s) and Generate Tags (212)

Semantically Filter Generated Pairs Compared to Query (210)

Receive First Question or First Question Set (207)

Generate question-and-answer pairs by QA LLM (208)

Generate First Question or First Question Set Based on Feedback by Rewrite LLM (205)

Generate Second Question or Second Question Set Based on Similarity Score of Refined Content Compared to First Question or First Question Set (206)

Generate Feedback by Feedback LLM (203)

Refine Content of Source Data into New Content Set by Refine LLM (204)

Receive Query (201)

Receive Source Data (202)

FIGURE 2

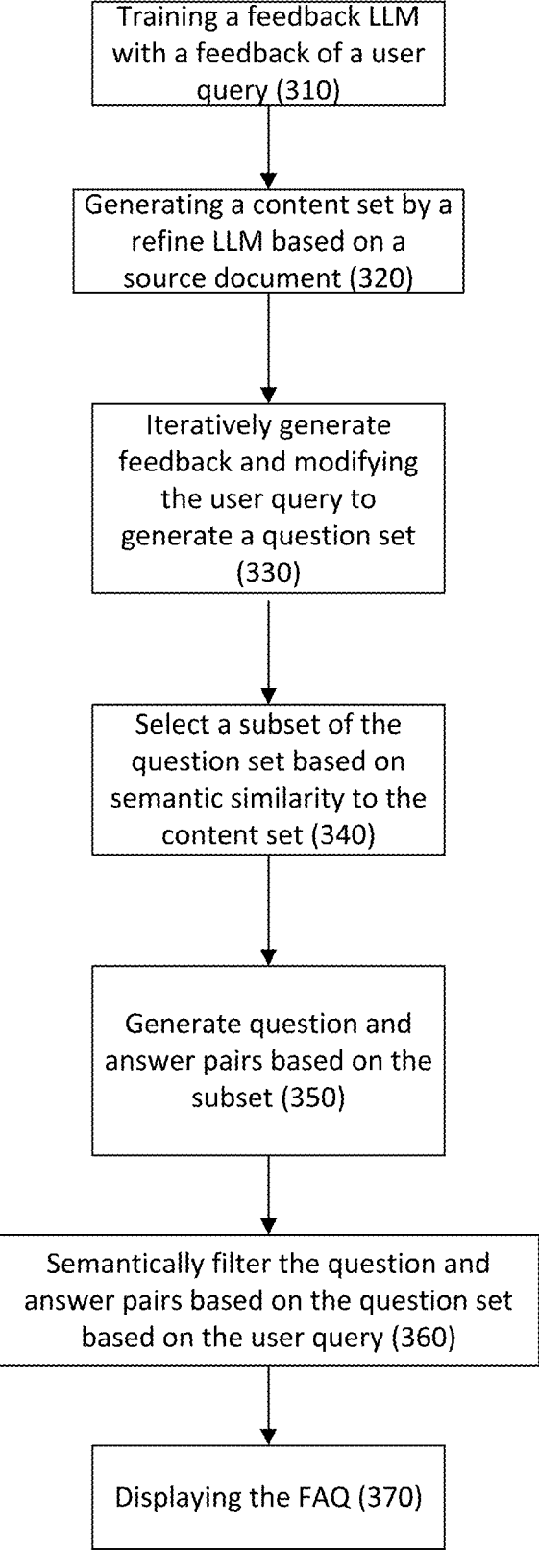

Training a feedback LLM with a feedback of a user query (310)

Generating a content set by a refine LLM based on a source document (320)

Iteratively generate feedback and modifying the user query to generate a question set (330)

Select a subset of the question set based on semantic similarity to the content set (340)

Generate question and answer pairs based on the subset (350)

Semantically filter the question and answer pairs based on the question set based on the user query (360)

Displaying the FAQ (370)

FIGURE 3

METHOD FOR AUTOMATIC GENERATION OF FREQUENTLY ASKED QUESTIONS

BACKGROUND

1. Field of the Invention

Embodiments generally relate to systems and methods for generation of frequently asked questions.

2. Description of the Related Art

The creation of Frequently Asked Questions (FAQs) is labor-intensive, relying heavily on subject matter experts or content creators meticulously reading content sources. It also requires manual extraction of key details from content sources before crafting appropriate questions and supplying answers. Current processes are time-consuming and do not scale with large numbers of content sources. As a result, oftentimes, current methods of producing FAQs result in FAQs that quickly become stale as updates occur to the original content. Also, since there is no link between content and FAQs, it is challenging at scale to determine which FAQs require updates when content is modified. These challenges make FAQ production even more challenging and time intensive. There is a need for a scalable, autonomous FAQ production model that leverages large language models to understand, extract, and summarize information from source documents. Further, there is a need for an autonomous FAQ model that can keep FAQs updated and current.

SUMMARY

According to some embodiments, the techniques described herein relate to a method including: defining, by a computer program executed by a computer, a first large language model (LLM) with a user query and a feedback of the user query; refining, by the computer program, the user query to a question set based on the feedback, the question set comprising one or more sentences; defining, by the computer program, a second LLM to generate a first set of question and answer pairs from a source document; defining, by the computer program, a third LLM to generate a content set from the source document based on a rewriting of the source document; selecting, by the computer program, top questions from the content set to be provided to the second LLM; generating, by the second LLM, a second set of question and answer pairs based on the top questions; determining, by the second LLM, answers to the question set based on the source document to generate a third set of question and answer pairs; semantic filtering, by the computer program, of first, second, and third sets of questions from the first, second, and third sets of question and answer pairs, the filtering being based on the user query; linking, by the computer program, the answers of the first, second, and third set of question and answer pairs to the filtered sets of questions; and publishing, by the computer program, the filtered set of questions and the linked answers.

According to some embodiments, the techniques described herein relate to a method including: inputting, by a computer program executed by a computer, a user query set into a first large language model (LLM); refining the user query set into a first question set based on a criteria of a feedback, the criteria comprising an existence of a question word in the first question; inputting, by the computer program, a source document to a second LLM, the second LLM configured to generate a content set from the source document; selecting, by the computer program, a second question set as a subset of the first question set based on a semantic similarity to the content set; generating, by a third LLM, a set of question and answer pairs based on the second question set provided by the computer program; selecting, by the computer program, a subset of the set of question and answer pairs based on a semantic similarity to the first question set; linking, by the computer program, the subset of the set of question and answer pairs to the source document; and publishing, by the computer program, the subset of the set of question and answer pairs.

According to some embodiments, the feedback may include whether an image is included in the FAQ response. According to some embodiments, the source document may be selected based on similarity to an input topic. According to some embodiments, the top questions may be a top 5 questions of the contents set. According to some embodiments, the instructions may comprise saving the source document to a cache, changes to the source document are checked periodically, the changes are provided to the second LLM, and the filtered set of questions and linked answers are regenerated and republished based on the changes. According to some embodiments, the instructions may comprise saving a link to the source document in the cache. According to some embodiments, older filtered sets of questions and linked answers are deleted before republishing.

Embodiments consistent with the present disclosure include a system including one or more processors and one or more storage devices storing instructions that when executed by one or more processors, cause the processor to perform one or more steps of the methods disclosed herein. Embodiments consistent with the present disclosure include a computer processing system, computer, or server, including: a memory configured to store instructions such as a non-transitory computer-readable storage medium; and a hardware processor operatively coupled to the memory for executing the instructions to perform one or more steps of the methods disclosed herein.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 2 illustrates a flowchart for providing machine learning based generation of frequently asked questions.

FIG. 3 illustrates a flowchart for machine learning based generation of frequently asked questions.

DETAILED DESCRIPTION

Embodiments generally relate to systems and methods for providing machine learning based generation of frequently asked questions.

Conventionally, creation of frequently asked questions (FAQs), including at least one question and at least one answer to the question, is labor-intensive and relies heavily on subject matter experts or content creators. Content sources must be read, analyzed, and painstakingly converted to useful questions and answers for consumers. When content sources change, it can create further issues because the frequently asked questions must be updated. However, the experts or creators may be unaware of the updates and thus the created FAQs become out-of-date and unhelpful. In some cases, links may be created that connect a FAQ to a source document where information may be found, but the links may be broken, and additional information on the source document may be added that changes how a FAQ should be addressed.

Further, large language models (LLMs) are used for generating answers to prompts, but LLMs can create wrong or inaccurate information. This reduces or eliminates the utility of requesting answers from LLMs because source documents must still be checked to verify the answer, and organizations publishing FAQs cannot provide faulty information to users because of liability, inefficiency, and further resources correcting mistakes in FAQs and counseling consumers. These problems further reduce or eliminate an ability to scale for many of an organization's services, each service requiring a FAQ, because each new FAQ requires review. Embodiments consistent with the present disclosure include a generative model to create FAQs that provides correct information to users consistently. The FAQs may be generated quickly, efficiently, and consistently, thus reducing significant time and manual resources.

Embodiments of the present disclosure include a FAQ generation model to create FAQs that leverage machine learning (ML). An exemplary ML model may be, e.g., a large language model (LLM) such as a Generative Pretrained Transformer (GPT) model. As used herein a model platform is a platform that hosts a ML model and provides access to the ML model. Access to the ML model may include an API interface and/or an interface that includes a prompt. A query management platform may provide access to a prompt that is provided by a model platform or may provide a prompt, where the prompt interfaces with an API interface of a model platform and passes a user query to the model platform. In some embodiments, the LLMS may extract and summarize information from source documents. The LLMs may be refined based on user queries.

Figure 1:
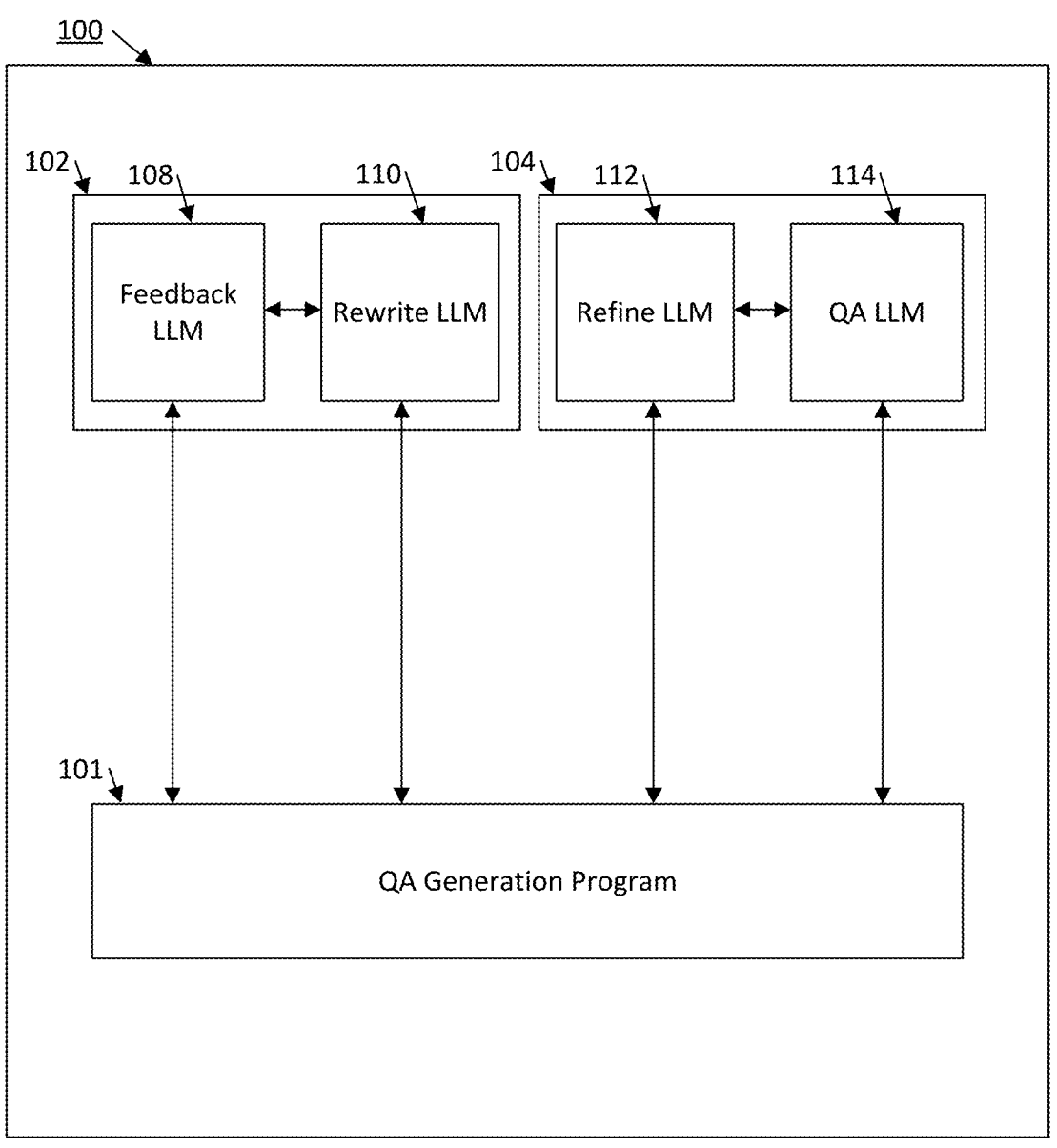
FIG. 1 illustrates a frequently asked question generation model.

FIG. 1 illustrates a model for generating frequently asked questions.

System 100 may include question-and-answer (QA) generation program 101, user-query refinement model 102, and content-based question and answer generation model 104. System 100 may be an environment or a platform executed on a computer system or across several computer systems that are accessible through a user interface executed on a computer system. The QA generation program 101 may be a computer program comprising instructions stored on a database that, when executed by a processor, cause the processor to manage and interact with the user-query refinement model 102, content-based question-and-answer generation model 104, and LLMs 108, 110, 112, 114.

In some embodiments, LLMs 108, 110, 112, 114 may be different LLMs or agent/instance LLMs that are trained separately and/or provided different rules. The training and/or rules are specific to the function described below.

The user-query refinement model 102 may be configured to include and/or interact with a feedback LLM 108 and/or a rewrite LLM 110. The feedback LLM 108 and the rewrite LLM 110 may be configured to exchange data to iteratively generate feedback and refine input user queries. Input user queries may be received from a user and by a user interface executed on a computer system in communication with or as part of QA generation program 101. Input user queries may be accessible by the QA generation program 101 through a database.

The user-query refinement model 102 may receive a set of user queries. In some embodiments, a feedback may be collected for each input user query. The feedback may be generated by a feedback LLM 108. The feedback LLM 108 may be trained based on exemplary feedback provided by experts for exemplary cases. The feedback may be on a scale (e.g., 1-10 with a number indicating a level of quality) or binary (e.g., yes or no). The feedback may be based on some criteria including for example whether the generated question is human readable (e.g., complete words, sentences), whether it can be beneficial for a broader audience (e.g., similar to an input topic derived from a query), and whether a style is correct as compared to previous exemplary questions (e.g., inclusion of a question word, placement and existence of a noun, placement and existence of a subject, placement and existence of a verb, placement and existence of punctuation, placement and existence of a prepositional phrase). The feedback LLM 108 may provide actionable modification steps. The rewrite LLM 110 may refine input user queries and select a subset of user queries based on the feedback. The feedback LLM 108 may iteratively generate feedback and the rewrite LLM 110 may perform refinement. The iterative loop of feedback and rewriting may stop when no changes are made or a change is determined to be minimal (e.g., affecting less than a threshold number of the set of input user queries).

The input user queries may be transformed by the content-based question and answer generation model 104 into FAQs that provide correct, relevant information to users. The content-based question and answer generation model 104 may be configured to generate questions and answers directly from a source document including information on a specific topic. The specific topic may be chosen as a word or words from a user query or queries or may be input by the user. The topic may be input by a user into the generation model and/or derived from a source data (e.g., a high percentage of usage of a word or phrase in the source data or a tag or title). In some embodiments, the LLM may pull in relevant data from outside sources use the relevant data to generate the context. The first question may be a formatted version of the stored user query or the received user query. The first LLM may format the first question by isolating words or words, weighting nouns or phrases by determining semantic similarity to example questions, and/or determining numerical values and/or vectors for identified nouns or phrases. A word or words may be isolated based on comparison to a database of words or phrases assigned to topics or intents. The FAQs may be displayed on a webpage, through a chat with a user, or as part of an application or generated for an email.

The content-based question and answer generation model 104 may reduce or eliminate hallucinations by rewrite LLM 110 when producing FAQs by reducing or eliminating a noise during a retrieval process. The retrieval process may include implementing, through the QA generation program 101, a semantic similarity filter to select questions from the content-based question and answer generation model 104 that exhibit high semantic similarity to the questions generated from the user-query refinement model 102. The semantic similarity may be calculated as a cosine similarity score between two k dimensional vectors, query embedding ($A \in R^k$) and the question embedding ($B \in R^k$), by following the equation:

$$Similarity = \frac{A \cdot B}{\|A\| \times \|B\|}.$$

The score is within a range between 0 to 1 and a threshold is defined to capture the questions that have high semantic similarity.

The captured questions may be narrowed by selecting the questions from the content-based question and answer generation model 104 based on semantic similarity. Using this method, the QA generation program 101 may narrow a number of questions generated from a practically unlimited set of a questions to a finite set of questions.

The QA generation program 101 may leverage information from the user-query refinement model 102 based on the content, the top n (e.g., top 0.5%, top 5 entries) high semantic similarity. Refined user queries from the user-query refinement model 102 may be used as examples for the specific content used in generating questions from content by the content-based question and answer generation model 104. By leveraging this few-shot generation strategy, the question generated from the content-based question and answer generation model 104 may mimic the style and keep the same level of granularity as queries asked by actual user. This method increases accuracy and responsiveness of FAQs.

The rewrite LLM 110 may reduce a content set to a new content set through refinement. For each refined content, a top number of related questions (e.g., a top five questions) from the refined questions set may be selected based on embedding-wise cosine similarity score. For example, the refined content and refined questions (e.g., from user queries) may be transformed into an embedding model (e.g., number representations, vectors), and the cosine similarity may be calculated based on the embedding. The selected questions will be used as examples for the generative model for question and answer pair generation in content-based question and answer generation model 104.

The rewrite LLM 110 may generate a set of questions from refined content (e.g., using chain of thought few-shots prompting). The QA LLM may use an answer generation prompt to leverage the set of generated questions and refined content to generate an answer. In the answer generation prompt, a LLM may provide "no information" if there is not sufficient content to answer a given question. Those questions with the "no information" answer will be removed from final set of questions. In this way, the approach avoids generating hallucinated questions and provides more accurate results.

The final FAQs may be selected by the QA generation program 104 through semantic filtering based on results from both the content-based question and answer generation model and the user-query refinement model. This filtering ensures that questions with high relevancy, consistency, and accuracy are selected. The corresponding answers from the content-based question and answer generation model are linked to the selected questions. The results are questions and linked answers. Semantic filtering may include selectively extract or remove information based on predefined semantic rules. The semantic rules may be based on a knowledge graph, one or more ontologies, and/or a database of subject-specific documents. Semantic filtering may include natural language processing including tokenizing a query or topic into smaller words and phrases, and performing dependency parsing on words based on whether a word or phrase is related to, for example, an adjective, verb, or noun/pronoun. In some embodiments, the tokens may be transformed into word embedding or numerical vector representations to express, for example, the dependencies or name entities. The semantic filtering may include word-sense disambiguation, concept extraction, and query expansion.

The QA generation program 104 may be configured to check answers against the source documents after generation. The generative model may track lineage between each generated question-answer pair and a section of a source document used to create the question-answer pair. For example, for each c set $\{c_1, c_2, \ldots, c_k\} \in C$ of question-and-answer pairs, the generative model maintains tags $\{t_1, t_2, \ldots, t_w\} \in T$. Additionally, a cache may store a version of an original source such as a document, a webpage, or a data repository. Periodically, such as every week, the version in the cache may be compared against the original source at its location. If a difference in the comparison is found, the generative model may be configured to proceed through the method again to generate questions and answers according to disclosed embodiments. In some embodiments, only the difference may be refined through the refine LLM and the already-tagged question and answer pairs may be regenerated through the QA LLM 114.

FIG. 2 illustrates a flowchart for providing machine learning based generation of frequently asked questions.

Method 200 may be a method of a generative model configured to generate FAQs consistent with disclosed embodiments. Method 200 may be executed as a set of instructions stored on a database of a computer system, the computer system including a processor configured to execute the set of instructions. A computer program may include the set of instructions. The computer program may be the QA generation program 101 discussed with reference to FIG. 1.

At step 201, the computer program may receive a query. The query may be provided by a user through a user interface operating as part of the QA generation program executed on a computer system. The query may be part of a database of user questions. The query may be generated by a query generation LLM based on previous user questions and a context. The context may be received as a user query from a user or as part of a source document. The context may be one or more details of a service or a product (e.g., name, use, parameters). For example, the context may be "product X" when a previous user question is about "product Y."

At step 203, a feedback LLM may generate feedback for the query provided by the computer program. The feedback LLM may be trained based on exemplary feedback provided by experts. A feedback may be stored as a rule or a suggestion. The feedback LLM may generate feedback based on the user query or a set of user queries. The feedback may be based on a criteria for a FAQ question. The criteria may be the first question and may be generated from a stored user query (from a database) or the first question may be a received user query from a user interface. The criteria may include for example whether the generated question is human readable (e.g., complete words, sentences), whether it can be beneficial for a broader audience (e.g., similar to an input topic derived from a query), and whether a style is correct as compared to previous exemplary questions (e.g., inclusion of a question word, placement and existence of a noun, placement and existence of a subject, placement and existence of a verb, placement and existence of punctuation, placement and existence of a prepositional phrase).

At step 205, a first question or first question set may be generated by a rewrite LLM based on feedback of the received query. The proposed rules or suggestions associated with the feedback or feedback set may be applied to the first question or first question set. The output first question set may be iteratively passed through feedback LLM and then the rewrite LLM until a number of changes to the first question or first question set is small or negligible. The computer program may compare an iteration of the question or question set to a previous iteration to determine the number of changes and/or extent of the changes (e.g., as determined based on a number of characters to change).

At step 207, the computer program may receive the first question or first question set from the rewrite LLM. The first question or first question set may be stored for later use and to be used for semantic filtering as discussed below with reference to steps 206 and 210.

At step 202, the computer program may receive a source data. The source data may be an input file such as a document or a webpage. The input file may be input by a user or identified. The input file may be identified by the computer program based on relevance to a context. The computer program may use a LLM to identify source data based on the context. The source data may be identified based on a comparison of the context to the source data (e.g., a threshold number of matches of words/phrases in the source data or a high percentage of matches of the subject matter to the source data).

At step 204, a refine LLM may generate a refined content by from the source data received from the computer program. The refined content may be based on searching for a key word of the context, a phrase of the context, words or phrases similar to the context, and/or words or phrases of the context matched to sentences, titles, or phrases from the source data, the words or phrases matched as synonyms in a synonym database stored on a memory accessible to the refine LLM.

At step 206, the computer program may receive or access the first question or question set as an output of the rewrite LLM. The computer program may also receive the new content set from the refine LLM. For each content of the new content set, a top number of related questions (e.g., a top five questions) from the refined questions set may be selected based on a highest/higher embedding-wise cosine similarity score. The top number of related questions may be a second question or second question set.

At step 208, the selected questions from step 206, the second question or second question set, may be used as examples by a QA LLM for question-and-answer pair generation. In some embodiments, the selected questions may be used as a few-shot technique in the QA LLM.

At step 210, the computer program may semantically filter generated question-and-answer pairs from QA LLM against first questions or the first question set from rewrite LLM. This filtering ensures that only those question-and-answer pairs that are highly relevant to the actual usage of the users are selected. The question-and-answer pairs with the top n (e.g., top 0.5%, top 5 entries) high semantic similarity may be selected and passed to step 212.

At step 212, the computer program may generate and tag a selected question-and-answer pair. The selected question-and-answer pair may include a link to a source document. A tag may be generated and recorded for each question-and-answer pair. In some embodiments, a cache of the source data and the tag may be recorded in a database. The cache may store a version of an original source such as a document, a webpage, or a data repository. Periodically, such as every week, the version in the cache may be compared against the original source at its location. If a difference in the comparison is found, the generative model may be configured to proceed through the method again to generate questions and answers according to disclosed embodiments. In some embodiments, only the difference may be refined and the already-tagged question-and-answer pairs may be regenerated.

FIG. 3 illustrates a flowchart for machine learning based generation of frequently asked questions.

At step 310, a method of FAQ generation, executed by a processor as logic of a computer program, that may include training a feedback LLM with a feedback of a user query. The feedback LLM may be in operative communication with a user-query refinement LLM. The feedback LLM may receive a set of user queries. The feedback LLM may reference feedback and/or the user query in a database accessible by the feedback LLM. In some embodiments, a feedback may be collected for each user query. In some embodiments, the feedback may be generated by the feedback LLM. The feedback LLM may be trained on relevancy (e.g., key word or phrase test), factualness (e.g., checking against more than one source or confidence rating of source), and/or consumer reception (e.g., from answered questions/surveys).

The feedback may be on a scale (e.g., 1-10 with a number indicating a level of quality) or binary (e.g., yes or no). The feedback may be based on some criteria including for example whether the generated question is human readable, whether it can be beneficial for a broader audience, whether the response includes a relevant image, and whether a style is correct. The feedback LLM may produce actionable modification steps for each user query.

At step 320, the method may include training, by the computer program, a content refines LLM based on a content and/or a source document identified based on the content. Training may include the computer program establishing training data sets and defining parameters to train the model. The content to refine from the source document may be determined as discussed above. The source document may be a received document. The content refine LLM may rewrite the content from a source document to a structured format. Given a content set, such as from the second LLM, a new content set may be generated by the content refine LLM. The content refine LLM may pass a set of refined content to a question-and-answer LLM.

At step 330, the method may include, by the feedback LLM and the content refine LLM, generating a question set based on an iterative generation of feedback based on a criteria and modifying the user query until no further changes to the question set are detected by the computer program. In other words, the loop may stop when no changes are made or a change is determined to be minimal (e.g., affecting less than a threshold number of the set of user queries). The criteria may be may be similar to the criteria discussed above, for example for step 203.

At step 340, the method may include, by the computer program, selecting a subset of the question set based on a semantic similarity score of the question set compared to the content set/new content set. For example, questions with higher/highest semantic similarity may be selected. Selected questions will be used as few shot examples and sent to a QA LLM for question-and-answer pair generation. The computer program may leverage information from the user-query refinement model by selecting the top n (e.g., top 0.5%, top 5 entries) of question-and-answer pairs that have a higher/highest semantic similarity with the new content set. Refined user queries from the user-query refinement model may be used as examples for selection of similar question-and-answer pairs that may be generated based on the source document. The selected question-and-answer pairs may be used to improve question-and-answer pairs generated by QA LLM for new source documents and/or user queries. By leveraging this few-shot generation strategy, the question generated from the generative model may mimic the style and keep the same level of granularity as queries asked by actual user.

At step 350, the QA LLM may generate possible question-and-answer pairs based on the set of questions based on the user query. The QA LLM may be trained based on exemplary question-and-answer pairs and/or previously selected question-and-answer pairs. The answers may be determined based on the questions. For example, the question-and-answer LLM may select a sentence or phrase from the source document. In some embodiments, the sentence or phrase may be rewritten into an answer form. In some embodiments, an answer feedback LLM may improve answers based on answer feedback based on criteria similar to the criteria discussed above with reference to step 203. The answer may be associated with each question from the subset to generate a question-and-answer pair.

At step 360, the computer program may semantically filter generated question-and-answer pairs from QA LLM against the question set based on the user query. This filtering ensures that only those question-and-answer pairs that are highly relevant to the actual usage of the users are selected. The question-and-answer pairs with the top n (e.g., top 0.5%, top 5 entries) high semantic similarity may be selected and passed to step 270. Semantic filtering may be performed similar to that discussed above for step 340.

At step 370, the method may include displaying, via a user interface in operative communication with the computer program, the final selected subset. The final selected subset may be published to a webpage, application, document, or other database. The final selected subset may be accessible by a user device through a communication (e.g., text, email, application, chat) or through access to the webpage, application, document, and/or other database.

Figure 4:
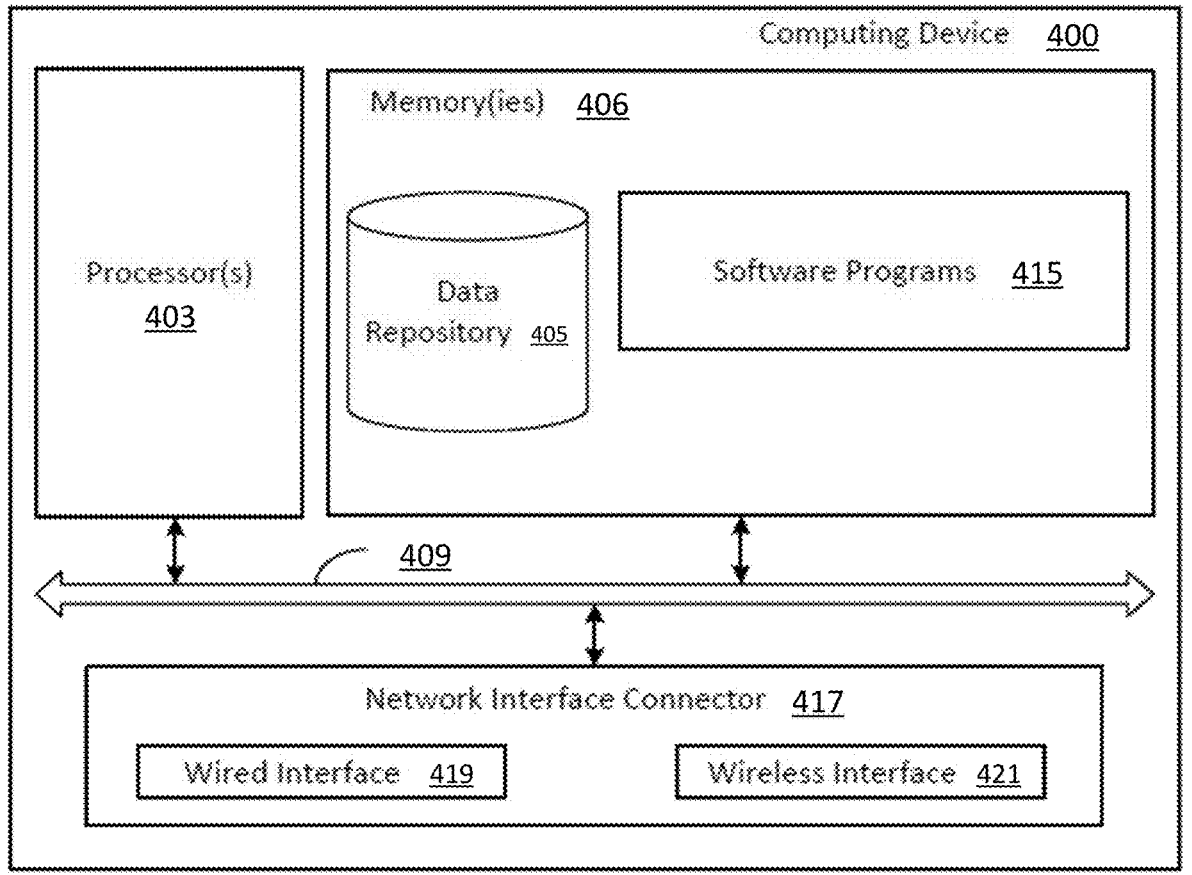
FIG. 4 illustrates a block diagram of a computing device for implementing certain aspects of the present disclosure.

FIG. 4 illustrates a block diagram of a computing device for implementing certain aspects of the present disclosure. FIG. 4 shows exemplary computing device 400. Computing device 400 may represent hardware that executes the logic that drives the various system components described herein. For example, system components such as a ML model engine, an interface, various database engines and database servers, and other computer applications and logic may include, and/or execute on, components and configurations like, or similar to, computing device 400.

Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

inputting, by a computer program executed by a computer, a user query set into a first large language model (LLM);

refining the user query set into a first question set based on a feedback criteria comprising an existence of a question word in a first question;

inputting, by the computer program, a source document to a second LLM, the second LLM configured to generate a content set from the source document, wherein the source document is selected based on similarity to a content of the user query;

selecting, by the computer program, a second question set as a subset of the first question set based on a semantic similarity to the content set, wherein the top semantic similarity is determined based on an embedding-wise cosine similarity score;

generating, by a third LLM, a set of question and answer pairs based on the second question set provided by the computer program;

selecting, by the computer program, a subset of the set of question and answer pairs based on a semantic similarity to the first question set;

linking, by the computer program, the subset of the set of question and answer pairs to the source document, wherein the computer program saves a link to the source document in the cache to a database;

publishing, by the computer program, the subset of the set of question and answer pairs;

saving, by the computer program, the source document to a cache;

periodically checking, by the computer program, changes to the source document;

providing, by the computer program, the changes to the second LLM to generate a revised content set;

providing, by the computer program, the revised content to the third LLM;

generating, by the third LLM, a revised set of question and answer pairs; and deleting and replacing, by the computer program, the subset of the set of question and answer pairs with the revised set of question and answer pairs.

2. A computer processing system comprising:

a memory configured to store instructions; and a hardware processor operatively coupled to the memory for executing the instructions of a text or call processing program to:

input, by a computer program executed by a computer, a user query set into a first large language model (LLM);

refine the user query set into a first question set based on a feedback criteria comprising an existence of a question word in a question word in the first question;

input, by the computer program, a source document to a second LLM, the second LLM configured to generate a content set from the source document, wherein the source document is selected based on similarity to a content of the user query;

select, by the computer program, a second question set as a subset of the first question set based on a semantic similarity to the content set;

generate, by a third LLM, a set of question and answer pairs based on the second question set provided by the computer program;

select, by the computer program, a subset of the set of question and answer pairs based on a semantic similarity to the first question set, wherein the top semantic similarity is determined based on an embedding-wise cosine similarity score;

link, by the computer program, the subset of the set of question and answer pairs to the source document, wherein the computer program saves a link to the source document in the cache to a database; and publish, by the computer program, the subset of the set of question and answer pairs;

save, by the computer program, the source document to a cache;

periodically check, by the computer program, changes to the source document;

provide, by the computer program, the changes to the second LLM to generate a revised content set;

provide, by the computer program, the revised content to the third LLM;

generate, by the third LLM, a revised set of question and answer pairs; and delete and replace, by the computer program, the subset of the set of question and answer pairs with the revised set of question and answer pairs.

3. A non-transitory computer readable storage medium, including instructions stored thereon, which when read and executed by one or more computer processors, cause the one or more computer processors to perform steps comprising:

inputting, by a computer program executed by a computer, a user query set into a first large language model (LLM);

refining the user query set into a first question set based on a feedback criteria comprising an existence of a question word in a question word in the first question;

inputting, by the computer program, a source document to a second LLM, the second LLM configured to generate a content set from the source document, wherein the source document is selected based on similarity to a content of the user query;

selecting, by the computer program, a second question set as a subset of the first question set based on a semantic similarity to the content set;

generating, by a third LLM, a set of question and answer pairs based on the second question set provided by the computer program;

selecting, by the computer program, a subset of the set of question and answer pairs based on a semantic similarity to the first question set, wherein the top semantic similarity is determined based on an embedding-wise cosine similarity score;

linking, by the computer program, the subset of the set of question and answer pairs to the source document, wherein the computer program saves a link to the source document in the cache to a database;

publishing, by the computer program, the subset of the set of question and answer pairs;

saving, by the computer program, the source document to a cache;

periodically checking, by the computer program, changes to the source document;

providing, by the computer program, the changes to the second LLM to generate a revised content set;

providing, by the computer program, the revised content to the third LLM;

generating, by the third LLM, a revised set of question and answer pairs; and deleting and replacing, by the computer program, the subset of the set of question and answer pairs with the revised set of question and answer pairs.

* * * * *